United States Patent Office 3,363,158
Patented Jan. 9, 1968

3,363,158
SERVO-MOTOR CONTROL SYSTEM HAVING A DISPLACED ERROR VOLTAGE TO COMPENSATE FOR INERTIAL DRIFT
Theodorus Gerhardus Potma, Emmasingel, Eindhoven, Netherlands, assignor to North American Philips Company, Inc., New York, N.Y., a corporation of Delaware
Filed July 28, 1964, Ser. No. 385,744
Claims priority, application Netherlands, July 29, 1963, 295,942
12 Claims. (Cl. 318—18)

ABSTRACT OF THE DISCLOSURE

A servo-motor system automatically compensating for inertial drift having a two input voltage comparator connecting the drive power to the servo-motor, one input of which includes a reference source, the other input of which includes a voltage corresponding to the instantaneous position of the servo-motor shaft. The other input also includes a switching circuit coupling the shaft position voltage to the comparator. The switching circuit has no effect on the shaft position voltage when the servo-motor is in its equilibrium position. When the shaft is driven out of equilibrium, the circuit adds to the position voltage a further time dependent voltage which causes the inputs to the comparator to reach unity relative to one another prior to the time it would otherwise. The result is to remove the servo-motor drive prior to the desired point, and allow the inertial drift of the motor to complete the desired movement. The switching circuit contains a resistive and capacitive element, the latter being continually charged in equilibrium and discharged in non-equilibrium. The voltage developed across the resistive element as a result of the capacitive discharge is added to the position voltage as described.

---

This invention relates to servo-motor control systems and more particularly to servo-motor control systems in which motor control is achieved by comparing a voltage, the magnitude of which is under the direct control of the motor, with a reference or error voltage.

In fast acting systems which are relatively sensitive to the difference in magnitude between the reference and servo-motor, controlled voltage braking of the servo-motor becomes quite critical due to the inertia of the mechanical system. If braking is instituted at the time of electrical equivalency hunting will result due to overshooting caused by the inertia of the mechanical rotation or movement.

Therefore, one object of the invention is to provide a servo system in which hunting due to the mechanical inertia is reduced.

Another object of the invention is to provide a servo system in which a correction voltage is algebraically added to the motor controlled voltage to anticipate braking as a function of servo rotation to minimize overshooting and hunting.

The invention contemplates a bidirectional servo system comprising a servo-motor for controlling a variable voltage source which has a magnitude corresponding to its attained position. A comparator is responsive to a reference voltage and the first voltage source for controlling motor movement to drive the first voltage to equality with the reference. A second voltage source, responsive to servo-motor direction, provides a voltage increasing in magnitude with time and having a polarity corresponding to the direction of motor movement a means for algebraically adding the voltage from the second source to the voltage from the first variable source is provided whereby the servo-motor is deenergized prior to the time when the first voltage source equals the reference voltage to thereby compensate for mechanical coasting due to inertia.

The foregoing and other objects and advantages of the invention will become more apparent from a consideration of the drawings and specification wherein several embodiments of the invention are shown and described for illustration purposes only:

Figure 1:
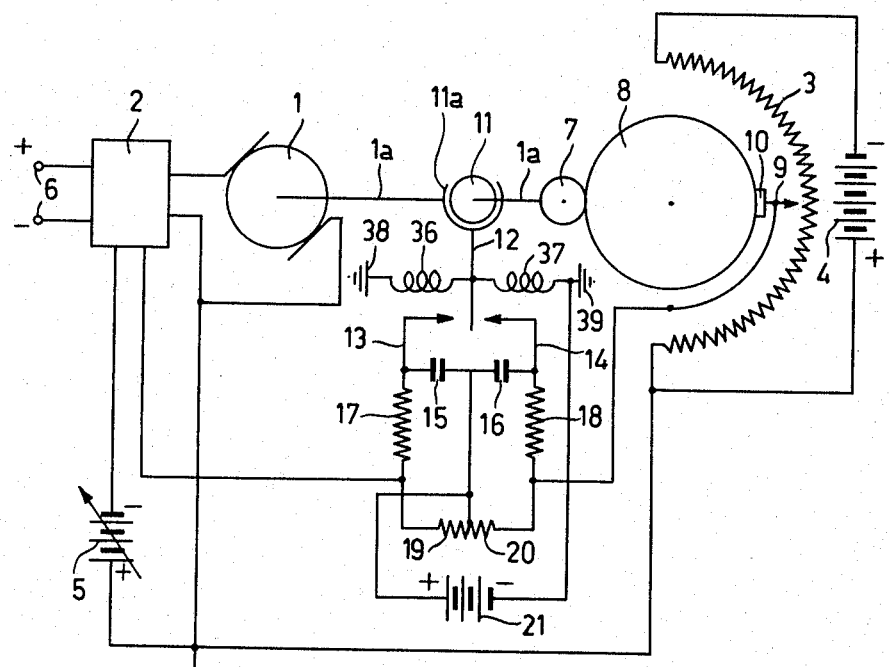
FIGURE 1 is a schematic diagram of a novel servo system constructed in accordance with the invention.
Figure 3:
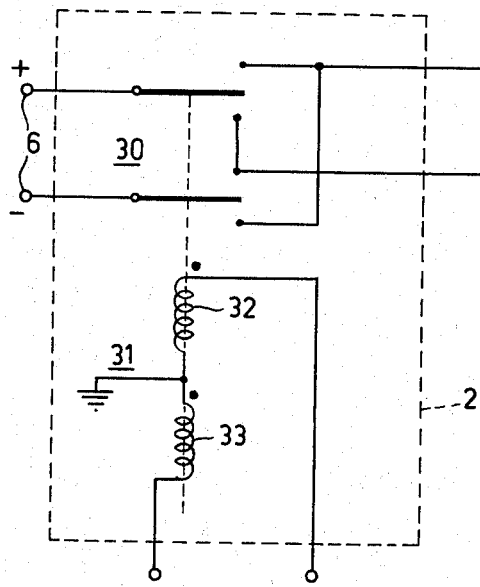

In FIGURE 1 a servo-motor 1, which may, for example, be a direct-current commutator motor, is connected to a direct-current source 6 by a comparator switching device 2. The comparator switch is separately illustrated in FIGURE 3 and comprises a double-pole double-throw switch 30 with a center "off" position controlled by a differential relay 31 having differential windings 32 and 33. One voltage comparing input connects winding 32 to a first voltage source which will be described later, and another voltage comparing input connects winding 33 to another voltage source. Thus, when the currents through winding 32 and 33 are equal, switch 30 is in the center "off" position and motor 1 is deenergized. However, when one current exceeds the other, motor 1 is energized for rotation in one direction and will reverse when the relative current magnitudes change.

This circuit arrangement is not part of the invention and is illustrated solely to facilitate understanding the circuit operation. Many other different circuits for performing this switching function in response to the relative magnitudes of two electrical manifestations are available and may be readily substituted for that shown.

The ouput shaft 1a of motor 1 is drivingly connected to a pinion gear 7 which meshes with and drives a drive gear 8. A wiper arm 9 of a potentiometer 3 is mounted on an insulating block 10 mounted on the periphery of gear 8. A slip clutch 11 is drivingly connected to output shaft 1a and actuates friction shoe 11a with an electrically insulated contact arm 12 mounted thereon. Arm 12 is positionally centered by a pair of springs 36 and 37 attached to fixed supports 38 and 39, respectively. Thus, when motor 1 is deenergized, contact 12 will be restored to a fixed reference position.

A battery 4 is connected across potentiometers 3 and has its positive terminal connected to ground. Wiper arm 9 is connected to winding 32, FIGURE 3, by series connected, equal resistors 19 and 20. A second battery 5 has its negative terminal connected to winding 33, FIGURE 3, and its positive terminal grounded.

A resistor 18 and a capacitor 16 are connected in series across resistor 20 and a resistor 17 and a capacitor 15 are connected in series across resistor 19. A contact 13 mounted on support 38 is connected to the common junction of capacitor 15 and resistor 17 while a contact 14 mounted on support 39 is connected to the common junction of capacitor 16 and resistor 18.

A battery 21 has its positive terminal connected to the common junction of resistors 19 and 20 and its negative terminal electrically connected through spring 37 to insulated contact 12. Thus clockwise rotation of contact arm 12 via rotation of shaft 1a places the arm in engagement with contact 13, while counterclockwise rotation of arm 12 via rotation of shaft 1a places the arm in engagement with contact 14.

Operation

When the system shown in FIGURE 1 is in equilibrium, that is the voltage picked off potentiometer 3 via wiper 9 equals the voltage of source 5, servo-motor 1 oscillates. The motor oscillates at a frequency determined by the inertia of mechanical parts 1, 1a, 7, 8, 9, 11, 12, 36 and 37 and by the time constant of electrical components 15–21, 2 and 1. The amplitude of the oscillatory motion may be adjusted by varying the spacing over a limited range of contacts 13 and 14. Small amplitudes may be achieved by reducing the spacing. How these components cooperate to produce this oscillatory motion will become apparent as the description continues.

Thus, in the equilibrium state capacitors 15 and 16 are charged to the voltage of source 21 since they are alternately connected across source 21 at the frequency of the oscillatory motion of motor 1 via contact arm 12 which responds to this motion. When both capacitors are equally and oppositely charged, the voltages across resistors 19 and 20 are cancelled and only the voltage picked off by wiper 9 appears at control circuit 2.

When the magnitude $V_5$ of source 5 is varied, for example, increased, comparison device 2 energizes motor 1 to cause gear 8 and wiper 9 attached thereto to rotate counterclockwise to increase the magnitude $KV_4$ of the voltage picked off of potentiometer 3. This causes a clockwise rotation of contact arm 12 placing it in engagement with contact 13. Once rotation starts as described above, capacitor 15 remains charged to the voltage of source 21 since it is connected directly across the source and capacitor 16 discharges across resistors 18 and 20. Thus the series combination of capacitors 15 and 16 has produced thereacross a voltage difference which increases with time:

$$\Delta V = V_{21} (1 - e^{-t/RC})$$

where $V_{21}$ is the voltage of source 21, $t$ is the elapsed time, R is the resistance of series connected resistors 18 and 20 and C is the capacitance of capacitor 16. A proportional portion:

$$p = \frac{R_{19}}{R_{17} + R_{19}} \text{ or } \frac{R_{20}}{R_{18} + R_{20}}$$

of the voltage difference appears across resistors 19 and 20 and is algebraically added to $KV_4$, thus, the supply to servo-motor 1 is interrupted before wiper 9 reaches the desired position at which the voltage picked off of potentiometer 3 ($KV_4$) equals $V_5$. However, due to the inertia of the mechanical parts, servo-motor 1 and connected mechanical components including wiper 9 continue rotation to approximately a point where $KV_4$ equals $V_5$.

If this position is not reached or passed, the supply circuit of servo-motor 1 is connected by circuit 2 and servo-motor 1 continues rotation in the desired direction. Due to the swinging motion of shoe 11a and contact arm 12 aided by spring 37 capacitor 16 is charged via contact arm 12 and contact 14 as soon as the motor slows to the full voltage of source 21. Thus comparison circuit 2 responds to the true voltage difference $KV_4 - V_5$ to repeat the process again. On subsequent cycles the servo-motor travels a smaller distance, therefore its speed does not attain full value and accordingly, the voltage difference $\Delta V$ does not attain its maximum value $V_{21}$ but only a smaller fraction thereof.

By a proper choice of the values of capacitors 15 and 16 and of resistors 17, 19 and 18, 20 the voltage difference $\Delta V$ may be made to increase approximately proportional to the square of the speed of rotation of servo-motor 1 and thus proportional to the kinetic energy which must be neutralized or absorbed in coasting to the desired position of wiper 9 after the servo-motor 1 is deenergized. In this respect, complete and rapid charging of capacitors 15 and 16 must be assured if the above stated operation is to hold. The absolute value of the correction voltage algebraically added P$\Delta V$ may be selected independently of the time constant RC by varying the ratio:

$$P = \frac{R_{19}}{R_{17} + R_{19}} = \frac{R_{20}}{R_{18} + R_{20}}$$

without changing the sum $R = R_{17} + R_{19} = R_{18} + R_{20}$. The ratio P must be selected to match the sensitivity of control circuit 2 and in order to insure that capacitors 15 and 16 will always be charged to the full voltage of source 21, the ratio must be sufficiently high that interruption of one of the charging circuits of a capacitor causes servo-motor 1 to start rotation in the reverse direction i.e. the voltage drop across resistors 19 or 20 following the swinging action previously referred to must cause sufficient voltage overshoot at the input to circuit 2 to energize servo-motor 1 for reverse rotation.

Figure 2:
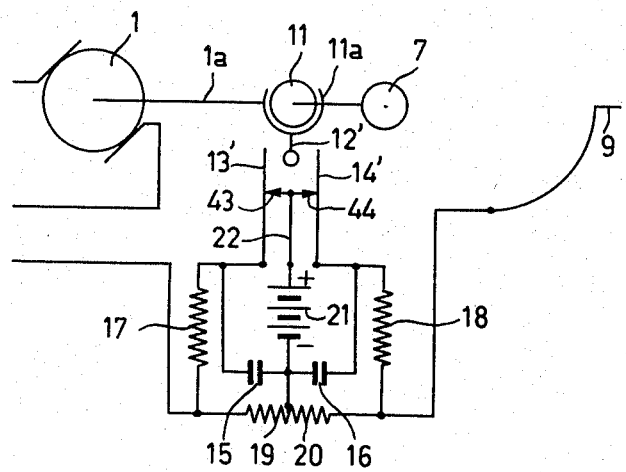
FIGURES 2 and 2a are schematic diagrams of two additional embodiments of the invention; and, FIGURE 3 is a schematic diagram of a component shown in block form.

In the embodiment illustrated in FIGURE 2 the contacts 13 and 14 are replaced by leaf contacts 13' and 14', respectively; these engage a pair of contacts 43 and 44, respectively, electrically connected to and supported by member 22 which is connected to the positive terminal of source 21. The negative terminal of source 21 is connected to the common junction of capacitors 15 and 16 and resistors 19 and 20. Friction shoe 11a supports an actuator 12' which is centered between leaf contacts by gravitational forces.

In the equilibrium position illustrated, actuator 12' is disengaged from leaf contacts 13' and 14'. This is accomplished by providing greater spacing between leaf contacts 13' and 14' than between contacts 13 and 14 of FIGURE 1 and by the elimination of springs 36 and 37 to prevent the swinging action previously described from engaging the other contact when motor 1 is deenergized. It should be noted that the polarity of battery 21 has been reversed from that shown in FIGURE 1. This is necessary since actuator 12' discharges the capacitor connected to the lead spring it engages. Thus the voltage algebraically added to the voltage picked off at wiper 9 must be reversed from that illustrated in FIGURE 1 otherwise overshooting of wiper 9 will result since it will appear to beat a lower voltage position with respect to source 5 than its actual attained position.

In the equilibrium position both leaf contacts are connected to source 21 and capacitors 15 and 16 are charged to the source voltage. When servo-motor 1 rotates, as described above, the electrical connection between 13' and 43 is broken and capacitor 15 discharges across resistors 17 and 19 thus providing the correction voltage P$\Delta V$ across series connected resistors 19 and 20 as previously described. Since oscillatory motion of servo-motor 1 is neither required nor desired to maintain capacitors 15 and 16 charged feedback across the electro-mechanical loop 1, 11, 12', 13', 14', 43, 44, 22, 15–21, 2 and 1 is preferably held as low as possible to minimize oscillation of servo-motor 1 in the state of equilibrium.

Figure 2A:
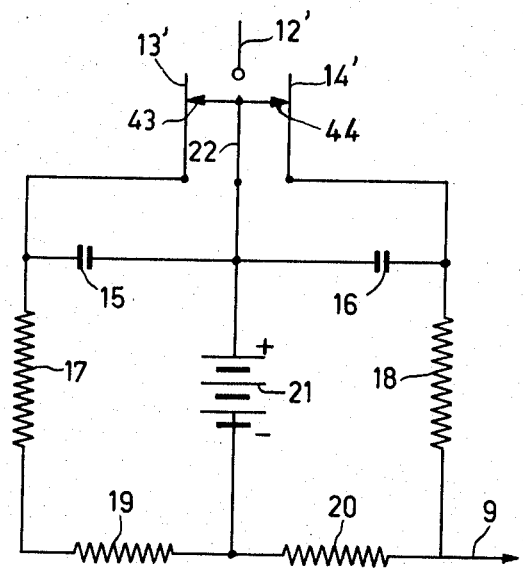

The embodiment illustrated in FIGURE 2a differs structurally from that shown in FIGURE 2 in a very minor way. Here the common junction of capacitors 15 and 16 is connected to the positive terminal of source 21 instead of the negative terminal. The capacitors 15 and 16 are short-circuited by elements 22, 43, 13' and 22, 44, 14', respectively, in the equilibrium condition.

Upon a rotation as previously described leaf contact 13' is moved out of engagement with contact 43 and capacitor 15 starts charging through resistors 19 and 17. Thus, the voltage across resistor 19 decreases toward zero at which point the voltage across resistor 20 is in its entirety algebraically added to the voltage picked off at wiper 9. The added voltage increases as the voltage across resistor 19 decreases since the voltages across resistors 19 and 20 are opposed.

When a definite or non-definite state of equilibrium is attained i.e. the two voltages applied to circuit 2, FIGURE 1, are equal, capacitor 15 is rapidly discharged as soon as leaf contact 13' engages contact 43.

The charging time of capacitors 15 and 16 must be selected according to the criteria previously stated for the discharge time in the other embodiment i.e. the charge must increase proportional to the square of the speed of rotation attained by servo-motor 1.

While the invention has been described throughout the specification as having the correction voltage applied to the voltage $KV_4$ picked off of potentiometer 3 it should be quite apparent that the reference voltage could be manipulated to produce the same result i.e. prevent overshooting of the mechanical system. However, if the correction voltage is to be inserted in the reference voltage circuit, it must be arranged in polarity to oppose the reference voltage to provide equality between $V_5$ and $KV_4$ before the mechanical system, which includes wiper 9, attains its desired value otherwise wiper 9 will overshoot.

While several embodiments of the invention have been shown and described in detail for illustration purposes, it is to be expressly understood that the invention is not limited thereto. Various changes may also be made in the design and arrangement of the parts without departing from the spirit and scope of the invention as the same will now be understood by those skilled in the art.

What is claimed is:

1. A servo system comprising a servo-motor, a first voltage source, means for varying the voltage from said first voltage source, said means being connected to said servo-motor for providing a voltage from said source having a magnitude corresponding to the motor position, a source of reference voltage, means connected to said first source and said reference source for providing a voltage proportional to the ratio of said first voltage and said reference source voltage, means responsive to motor movement for altering said ratio between the first voltage source and the reference voltage source in such a direction that unity ratio is achieved prior to the actual attainment of equality, and means responsive to the altered voltages for deenergizing the servo-motor as soon as unity ratio is attained to compensate for coasting due to the inertia of the mechanical portion of the servo system.

2. A servo system comprising a servo-motor, a first voltage source, means for varying the voltage from said first voltage source, connected to said servo-motor for providing a voltage from said source having a magnitude corresponding to the motor position, a source of reference voltage, means connected to said first source and said reference source for providing a voltage proportional to the ratio of said first voltage and said reference source voltage, means for comparing the reference voltage and the first variable voltage and for deenergizing said servo-motor when the ratio of the magnitude attains unity, and means responsive to servo-motor movement for altering the ratio of the magnitudes of the two voltages in such a direction that unity ratio is achieved prior to the actual attainment of equality to thereby compensate for coasting due to the inertia of the mechanical portion of the servo-system.

3. A servo system as set forth in claim 2 in which said means for altering the ratio of the magnitudes of the two voltages in response to servo-motor movement includes, first and second circuits in series circuit arrangement with one of the voltage sources providing the ratio, said circuits providing equal and opposed voltages in the state of servo-motor equilibrium, and means responsive to servo-motor movement for causing a differential voltage to be provided by the algebraic sum of the two voltages in the said first and second circuits, said differential voltage having a magnitude corresponding to the square of the speed of servo-motor rotation and a polarity to provide a unity ratio before the magnitude of the first voltage source equals the reference voltage source.

4. A servo system as set forth in claim 3 in which said first and second circuits include resistive and capacitive elements, a source of charging potential connected to said circuits and contact means connected in said circuits and responsive to servo-motor motion for controlling the charge state of the capacitive elements.

5. A servo system as defined in claim 4 in which said contact means includes first and second contacts connected to the first and second circuits, respectively, a slip clutch connected to the servo-motor and a contact arm mechanically connected to said slip clutch and electrically insulated therefrom and arranged to engage said first contact with motor movement in one direction and said second contact with motor movement in the opposite direction.

6. A servo system as set forth in claim 3 in which said first and second circuits each include resistive and capacitive elements, and an auxiliary source of potential having at least one connection to each of said first and second circuits, and contact means for connecting said auxiliary source, in the equilibrium state of the servo-motor, to charge the capacitive elements in each circuit to provide the said equal and opposed voltages and responsive to the direction of servo-motor movement for causing a predetermined capacitive element to discharge through its associated resistive element whereby a differential net voltage in the said series circuit arrangement is provided.

7. A servo system as defined in claim 6 in which said contact means includes first and second contacts connected between the auxiliary voltage source and the first and second circuits by first and second leaf contacts, respectively, a slip clutch connected to the servo-motor, and an actuator responsive to the movement of the slip clutch for interrupting the electrical connection between the first contact and the first leaf contact when the servo-motor moves in one direction and between the second contact and the second leaf contact when the servo-motor moves in the opposite direction.

8. A servo system as set forth in claim 3 wherein said first and second circuits each include series connected resistive and capacitive elements, an auxiliary source of potential connected in series with each of said first and second circuits, and contact means for short circuiting the capacitive elements in each said first and second circuit in the equilibrium state of the servo-motor and responsive to the direction of servo-motor movement for interrupting the short circuit across one of said capacitive elements whereby that element is charged toward the auxiliary potential to provide a differential net voltage in the said series circuit arrangement.

9. A servo system as defined in claim 8 in which said contact means includes a first contact connected to one side of the capacitive element in the first circuit and a first leaf contact connected to the other side of said capacitive element, said first leaf contact engaging the first contact in the state of servo-motor equilibrium, a second contact connected to one side of the capacitive element in the second circuit and a second leaf contact connected to the other side of said capacitive element, said second leaf contact engaging the second contact in the state of servo-motor equilibrium, a slip clutch connected to the servo-motor, and an actuator responsive to the movement of the slip clutch for interrupting the electrical connection between the first contact and the first leaf contact when the servo-motor moves in one direction and for interrupting the electrical connection between the second contact and the second leaf contact when the servo-motor moves in the opposite direction.

10. A servo system comprising a servo-motor, a source of energy supplying said servo-motor, a first voltage source, means for varying the voltage from said first voltage source, said means being connected to said servo-motor for providing a voltage from said first source having a magnitude corresponding to the attained servo-motor position, a source of reference voltage, correction means including a second voltage source operable in response to servo-motor movement for providing a correction voltage and means for adding said correction voltage to the voltage provided from said first voltage source with a polarity such that the sum of the two voltages equals the reference voltage before the voltage provided from said first voltage source attains the reference value as a result of servo-motor movement, and comparison means responsive to the reference and summed voltages for disconnecting the servo-motor from said source of energy as soon as the sum and reference voltages attain equality to compensate for coasting due to inertia in the mechanical drive.

11. A servo system for bidirectional control comprising a servo-motor, a source of energy supplying said servo-motor a first voltage source, means for varying the voltage from said first voltage source, said means being connected to said servo-motor for providing a voltage from said first voltage source having a magnitude corresponding to the attained servo-motor position, a source of reference voltage, comparison means responsive to said reference voltage and said first voltage for controlling the energization of said servo-motor to alter said first voltage source to secure equality between the reference and the first voltage source, a second voltage source responsive to the direction of servo-motor movement for providing a voltage increasing in magnitude with time and having a polarity determined by the direction of servo-motor movement, and means for algebraically adding the voltage from the second source to the voltage from the first source whereby the motor is disconnected from said source of energy prior to the time when the first voltage source attains a value equal to the reference to compensate for coasting of the mechanical drive due to inertia.

12. A system compensating for inertial drift in a servo-motor control, comprising a servo-motor having a driven shaft, a first source of voltage, voltage comparing means having first and second voltage comparison inputs, said comparing means connecting said first source of voltage to said motor for driving said motor in response to a ratio condition of non-unity between the first and second voltage comparison inputs and disconnecting said source from said motor in response to a ratio condition of unity between said inputs, a second source of voltage, means coupling said second source of voltage to one of said voltage comparison inputs of said voltage comparing means, a third source of voltage, means responsive to the position of said motor shaft for developing a voltage magnitude from said third source of voltage corresponding to the position of said motor shaft, and circuit means coupling said voltage magnitude to the other voltage comparison input of said comparing means, said circuit means including a resistive element, a capacitive element, switching means responsive to an equilibrium position of said motor shaft for maintaining said capacitive element in a charged state and to a non-equilibrium position of said motor shaft for discharging said capacitive element through said resistive element, said discharge providing a voltage to said comparison means in algebraic addition to the voltage developed from said third source in order to provide a unity ratio between said first and second voltage comparison inputs prior to the actual attainment of unity between said second and third voltage sources to compensate for inertial drift.

References Cited
UNITED STATES PATENTS

| | | | |
|---|---|---|---|
| 2,192,022 | 2/1940 | Wills | 318—28 |
| 2,500,314 | 3/1950 | Jacobson. | |
| 2,674,707 | 4/1954 | DeMott | 318—29 |

BENJAMIN DOBECK, *Primary Examiner.*